United States Patent [19]

Powell

[11] 4,140,959
[45] Feb. 20, 1979

[54] ELECTRICAL POWER GENERATING SYSTEM

[76] Inventor: William S. Powell, Rte. 2, Box 203A, Thornville, Ohio 43076

[21] Appl. No.: 706,770

[22] Filed: Jul. 19, 1976

[51] Int. Cl.² .............................. F03D 9/00; H02J 3/40
[52] U.S. Cl. ..................................... 322/100; 307/46; 307/87; 363/136
[58] Field of Search ............... 320/14; 322/2, 35, 100; 307/46, 66, 69, 70, 71, 72, 73, 74, 75, 45, 47, 87; 290/44, 55; 321/8; 363/136

[56] References Cited

U.S. PATENT DOCUMENTS

| 2,979,551 | 4/1961 | Pack | 320/61 X |
|---|---|---|---|
| 3,435,248 | 3/1969 | Geis | 307/46 |
| 3,895,236 | 7/1975 | Herron | 290/44 X |
| 4,010,381 | 3/1977 | Fickensher et al. | 307/66 |
| 4,059,772 | 11/1977 | Wilkerson | 322/2 R |

*Primary Examiner*—Robert J. Hickey
*Attorney, Agent, or Firm*—Mahoney & Stebens

[57] ABSTRACT

An electrical power generating system is provided for supplementing an electrical power distribution network. The supplemental system of this invention is devised to utilize available sources of energy that are otherwise unused and converting that energy to power which is added to and utilized in the normal or primary electrical power distribution network. The system of this invention includes electrical generation means of a type that is adapted to be powered by a specific energy source and develops electrical energy which is stored for intermittent or periodic transfer into the primary power system. An electrical circuit is provided for sensing of the electrical power that is stored and includes a switching circuit that is responsive to the stored electrical power for connecting an electrical energy storage device to the primary electrical network and affect a transfer of electrical power. A sensing and triggering circuit is provided for the detection of the electrical energy storage level and the wave-form of the primary electrical distribution network and is operative in response thereto, for transfer of the electrical energy in synchronized relationship to that wave-form. A wave-form shaping circuit is also provided for better matching of the supplemental power transferred to that of the primary circuit.

5 Claims, 3 Drawing Figures

ELECTRICAL POWER GENERATING SYSTEM

BACKGROUND OF THE INVENTION

The specific utilization of this invention is directed to smaller unit electrical power users, such as, households, small businesses, farms and light industrial users. Conservation of electrical power is a specific objective which has received considerable attention and has consequently resulted in the expenditure of substantial effort and money in the investigation of alternatives and supplemental sources of electrical energy. The most notable of these sources are the well-known attempts at utilization of wind power for the driving of electrical generators, solar cells that are operative in the direct generation of electrical energy, or sources of heat energy that would otherwise be ineffectually dissipated. Water power is another important source of supplemental energy and is readily available in the form of flowing streams or ocean tides.

A common defect or defiency with the known and previously available supplemental electrical energy source systems is that they are not able to continually supply the electrical demands of a typical utilization units such as a household or small business. Specifically, wind power is of an intermittent nature and consequently a wind driven generator which is dependent on the wind and will not always be enabled to produce the necessary electrical power at the time it is needed. Similarly, solar energy is limited to daytime utilization and its efficiency and effectiveness during the daytime is often diminished or essentially eliminated as the consequences of cloudy weather conditions. However, electrical power use in the household, business or light industry, can not be dictated by these conditions or factors and it is essential that the power be provided or be available at all times. Accordingly, even though an auxiliary electrical power source is provided, it remains essential that the utilization unit retain its connection to a primary electrical power distribution network, generally a public utility power system.

SUMMARY OF THE INVENTION

The electrical power generating system of this invention is specifically designed as previously indicated to supplement a primary power distribution network. It is designed to supplement that power in an automatic manner and obtain the beneficial and economic advantages, as well as energy conservation, without limitation as to the previous concept of providing the two sources of power in an alternative and not concurrently operative manner. The supplemental electrical power generating system of this invention is specifically designed to provide electrical power from any of the previously indicated available energy sources. A specific example of such a source is the wind-powered, electrical generator which operates to develop and generate electrical power during the time that this energy source is available.

The novelty of this inventive system which distinguishes it from the prior art attempts at supplementing electrical power system by the alternative supply technique is that the electrical power thus generated is not necessarily immediately utilized but is transferred into the utilization system whenever a specific minimal block or unit of electrical energy has been generated or stored. The system of this invention includes electrical energy storage means which receives and stores the supplementally generated power until such time as the amount is sufficient for useful injection and transfer into the utilization system. It will be noted that storage of electrical energy, in accordance with the concept of this invention, does not involve the storage of large amounts of power accumulated over a substantial period of time before transfer at a particular time as an alternative source to the primary electrical power. Energy storage, in accordance with the concept of this invention, requires only the storage of a relatively small amount of power which is accumulated for a relatively short period of time and when of a useful magnitude is then transferred into the system. This transfer of power on an intermittent and "as available" basis, results in effecting of considerable economy and a substantial energy conservation over a long period of use.

The electrical circuitry for performing the previously described function includes a storage network, particularly comprising a capacitor circuit which receives and stores the supplementally generated electrical power. Storage of electrical energy requires the development and generation of direct current power whereas the usual circuit in a household or other utilization system is of the alternating current type. Accordingly, the circuitry of this invention embodiment is designed to sense the storage of the energy in the capacitor circuit and, when a predetermined block of power has been generated and stored, the circuitry is automatically operative to sense this fact and to effect the transfer of electrical energy into the utilization system. This is accomplished by a switching network that includes sub-systems for detection and sensing of the stored energy level and for determining proper phasing of the circuit to assure that the electrical power will be transferred in synchronization with the primary electrical power source and, therefore, entirely utilizable.

A further objective of this invention is the safety feature of preventing transfer of electrical power from the system of this invention into the primary distribution system except when the primary system is also providing power. This objective is achieved by the circuitry of this invention which requires an input signal from the primary system for synchronization and thus does not function to discharge the capacitor circuit. Safety is thus further enhanced since no power will be applied to an otherwise dead primary distribution system where injury could result to a workman repairing the primary system.

The system of this invention has been initially described as being supplemental with relatively short duration transfer of power. It will be understood that, where the auxiliary power and energy source is of sufficient capacity for continuous power generation, a more continuous form of power transfer will be enabled. Specifically, with an adequate auxiliary or supplemental energy source for a particular utilization system, the generation of electrical power will be essentially continuous and the circuitry of the invention will then continuously transfer that power in supplementing and replacing the electrical power that would otherwise be necessary to be obtained from the primary distribution system. It will be understood, however, that total replacement of the primary distribution system power will normally not occur as an input signal is required, and, even if a proper input signal were provided to obtain the proper frequency power, it would be necessary to first assure that a dead primary distribution system were completely disconnected.

These and other objects and advantages of this invention will be readily apparent from the following detailed description of an embodiment thereof and the accompanying drawings.

DETAILED DESCRIPTION OF THE ILLUSTRATED EMBODIMENT

Figures 1, 3:
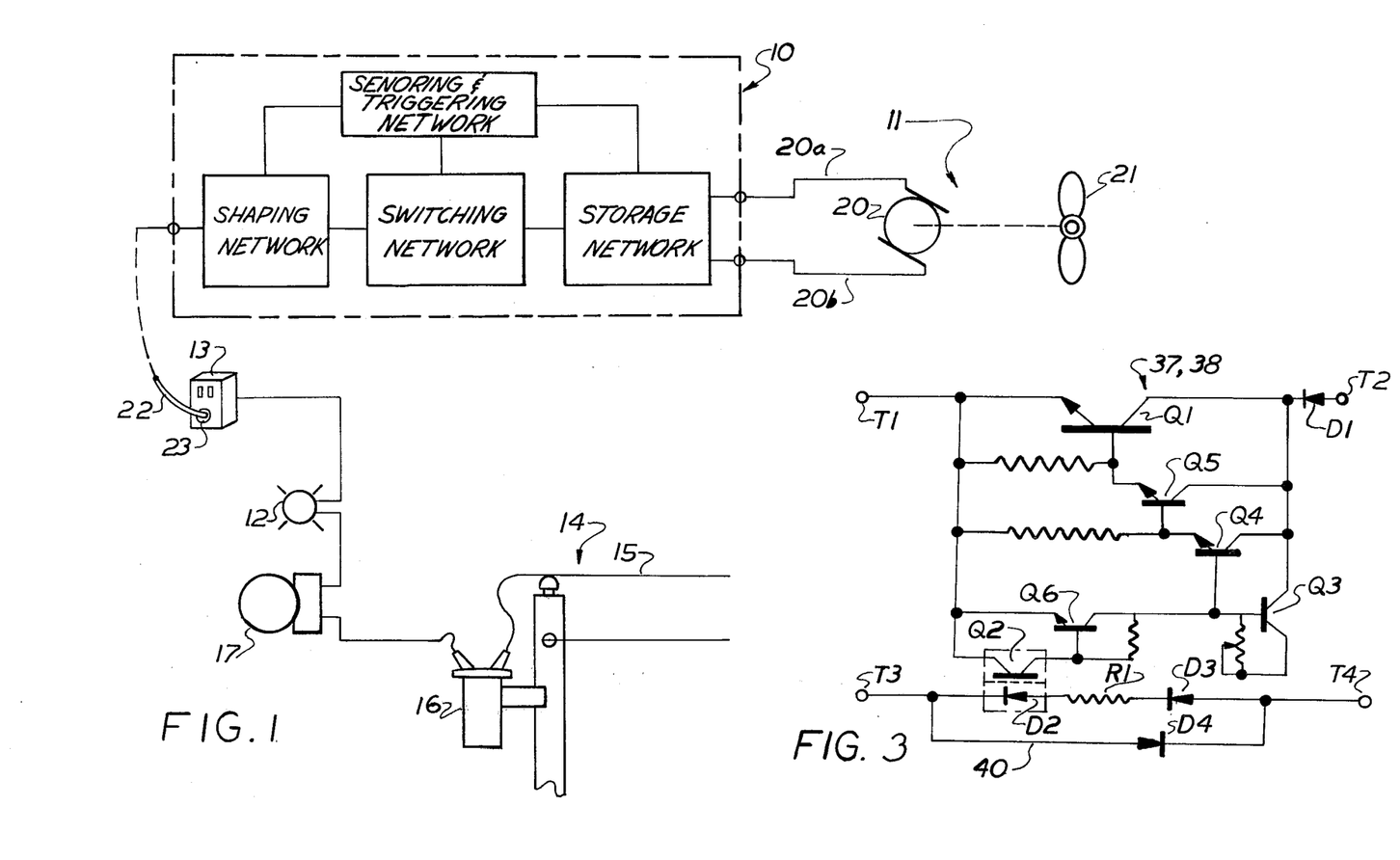
FIG. 1 is a diagramatic illustration of an electrical power generating system embodying this invention.
FIG. 3 is a detailed schematic of a switching circuit for utilization in the inventive system.

Having reference to FIG. 1, a typical circuit is shown for the supplemental generation of electrical power utilizing the concept and principles of this invention. This system is shown as including a control circuit 10 and electrical power generating means 11 which are operatively interconnected with a typical illustrative electrical energy utilization system. This utilization system is shown as comprising a consumer load as represented by an incandescent lamp 12 and an electrical power outlet or receptacle 13. This utilization system is also shown as connected to a public distribution network designated generally by the numeral 14. This public distribution network 14, which normally supplies the electrical power to the utilization system, includes the power transmission line 15, a transformer 16 for reducing the voltage to the conventional household power of 115 volts, and a watt-hour meter 17 for measuring the power consumption.

The electrical generating means 11 illustrated as being connected to the control circuit 10, comprises a wind-power driven generator 20. This generator is only diagrammatically illustrated and is shown to be of an alternating current type. Also, diagrammatically illustrated is the mechanical connection thereof with a wind-driven propulsion apparatus 21. It will be understood that this power generation mechanism is illustrative and that other sources of electrical energy may also be provided and substituted or combined with this particular means.

Utilization and installation of the system of this invention is greatly facilitated by the packaging of the control circuitry into a single unit that is readily interconnected with the generator 20 and the consumer load. This is accomplished by providing output conductors 22 of the control circuit with a connector plug 23 of the type that is adapted for interconnection with the receptacle 13. Accordingly, it is only necessary that the consumer position the control circuit 10 in a convenient location, connect the plug 23 to any of the readily accessible receptacles 13 located in the household or other building structure, and to connect an input of the control circuit to the electrical power generating means 11. Installation and operation of the electrical power generating means 1 is determined by the specifics of the available energy source that is to be utilized. A particular structure and installation may require additional technical skill; however, such additional technical skill is well within the scope of those skilled in this art. Accordingly, it is not necessary to describe such installation or to illustrate the installation in greater detail then is shown in FIG. 1.

Figure 2:
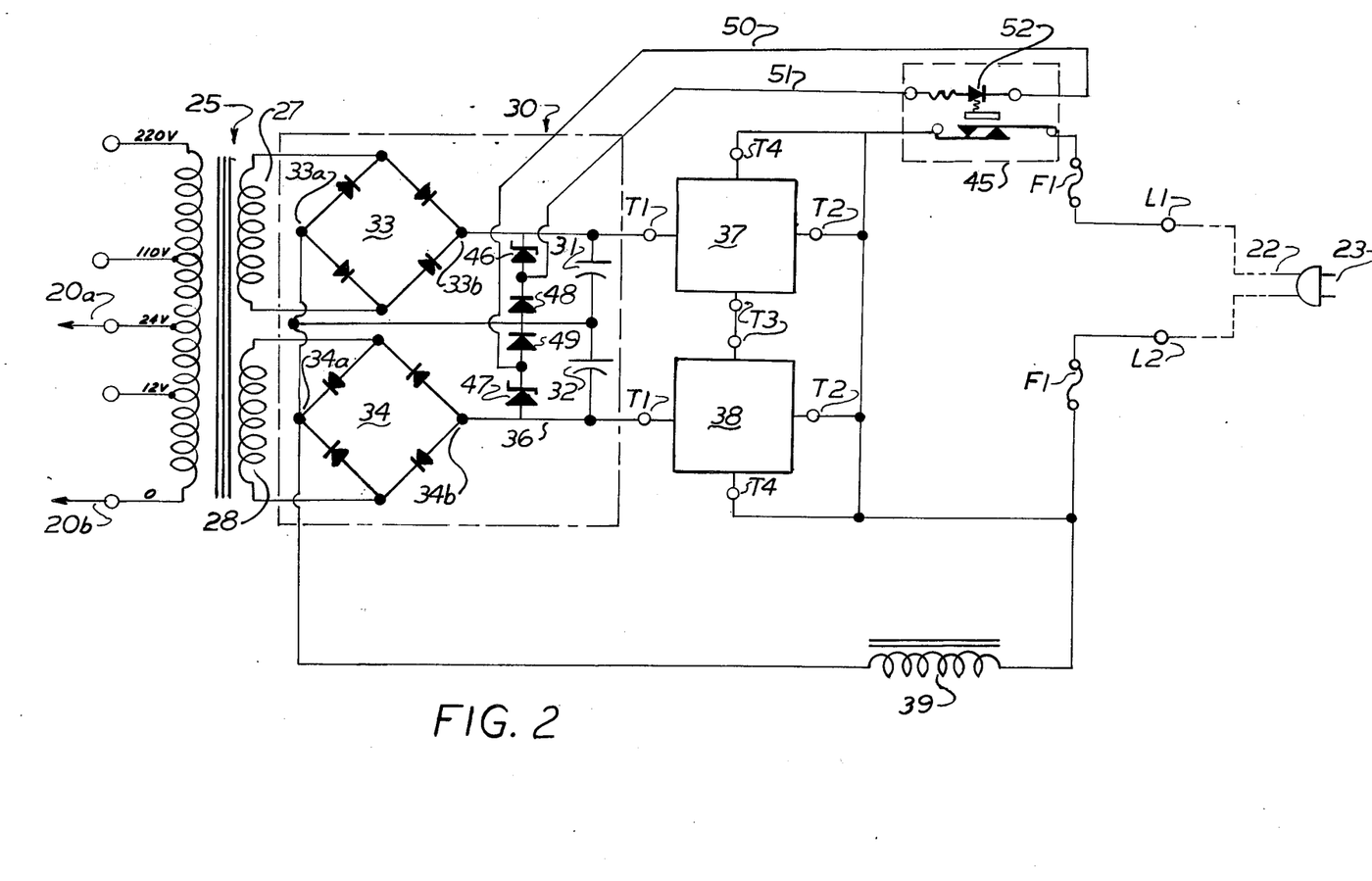
FIG. 2 is a schematic diagram of the control circuit shown in FIG. 1.

It will be noted from FIG. 1 that the generator 20 is indicated to be of an alternating current type. The output conductors 20a, 20b of the generator are connected to an input terminal section of the control circuit 10 which is better illustrated in FIG. 2. Referring to FIG. 2, it will be seen that this input terminal section includes an isolation transformer 25 having a multi-tap primary winding 26 and two secondary windings 27 and 28. In this illustrated embodiment, the multi-tap primary winding 26 is provided to facilitate interconnection of the control circuit 10 with a generator 20 which may have any one of a number of standard output voltages. These input taps are indicated to be for either 12, 24, 110 or 220 volt inputs as these are the most common output voltages for generators designed for this purpose.

Connected to the outputs of the two secondary windings 27 and 28 is the energy storage network 30. This energy storage network 30 includes two capacitor-type storage units 31 and 32 which are each connected to the output terminals of respective full wave rectifier 33 and 34. Each of the bridge type rectifiers 33 and 34 has its input terminals connected across a respective secondary winding 27 or 28. It will be noted that the two capacitor storage units 31 and 32 are connected in this circuit to enable the apparatus and system to function in transfer of electrical power into the consumer load circuit during either of the half-cycles of the sinusoidal wave-form current. Accordingly, the capacitor storage units 31 and 32 are interconnected to a common conductor that connects to a pair of opposite polarity output terminals 33a, 34a of the respective rectifiers with the two capacitors 31, 32 being series connected across the opposite pair of output terminals 33b, 34b.

These last named output terminals 33b, 34b of the rectifiers are interconnected by a respective conductors 35 and 36 to a terminal of the respective capacitor storage unit and to an input terminal TI, T2 of each of two switching circits 37 and 38. Each of the switching circuits 37 and 38 has an output terminal T2, T1 with both terminals being connected to an output terminal L1 of the control circuit. The output of the control circuit also includes the terminal L2 and these terminals are in turn connected by the conductors 22 to the connector plug 23 for interconnection into the consumer load. The second output terminal L2 is connected through a coil 39 to one of the pairs of interconnected output terminals 33a, 34a of the rectifier circuits 33 and 34. Operation of the switching circuits 37 and 38 will thus be seen effective in discharging the respective capacitor storage unit 31 or 32 for the transfer of electrical power into the consumer load circuit. Depending on which of the switching circuits 37 and 38 is operated, the output power is either a positive-or negative-going half-cycle, or portion of that half-cycle, and will be transferred into the consumer load circuit in synchronized relationship with the sinusoidal wave-form power normally received from a public distribution network 14. The output circuit is protected by respective fuses F1 and F2 that are series connected with the terminals L1 and L2.

It is necessary that the power transferred from the control circuit be of substantially the same wave-form as that of the public distribution network to assure a proper operation of the electrical units that may be connected to that circuit. These electrically driven units are designed for optimum performance with the conventional sinusoidal wave-form power. In the illustrated circuit, the necessary wave-form shaping is accomplished by the cooperative relationship of the storage unit capacitors 31 and 32 working in combination with the coil 39. Appropriate component values are selected to achieve the desired wave-form.

It is also necessary that the switching circuits 37, 38 operate synchronously with the public distribution network and these circuits shown in greater detail in FIG. 3, advantageously utilize solid state switching devices to effect this objective. A transistor switch Q1 is provided in each of the switching circuits 37 and 38 to perform the power switching function. This power switching transistor Q1 will be seen having its emitter and collector terminals connected between the input and output terminals T1 and T2 of the circuit. A reverse current protective diode D1 is also interconnected in series circuit with the collector of the switching transistor Q1 as it will be noted in FIG. 2 that the circuits are alternately or reverse connected to function in transfer of electrical power depending on which half-cycle of power is to be transferred at any particular instance.

Switching of the transistor Q1 to a conductive state is dependent on the simultaneous concurrence of two control factors. These control factors are that a respective capacitor storage unit 31 or 32 has been charged to a previously determined minimum level so as to be efficient in the transfer of power and that the switching is synchronized with the wave-form of the public distribution network. Synchronization of the switching operation is controlled by a photo-coupled Darlington switching circuit 40. This switching circuit, for synchronization, has respective terminals T3 and T4 effectively connected across the output terminals L1 and L2 of the control circuit 10. Accordingly, the sinusodial wave-form of the public distribution network will be sensed and detected and the associated circuitry is thus only operative to permit switching of the power transistor Q1 to a conductive state at essentially the beginning of either the positive or negative going half-cycle, as is appropriate for the particular switch 37, 38. Again, referring specifically to FIG. 3, it will be seen that the synchronization switching circuit 40 includes a photo-coupled Darlington switch Q2 having an associated light emitting diode D2 series connected with a current limiting resistor R1 and reverse current protective diode D3.

It will be noted that the synchronization circuits 40 which are identical for both switching circuits 37 and 38, are series connected in relative opposition across the control circuit output terminals L1 and L2. Accordingly, the reverse current circuits include a diode D4 connected across each of the respective circuit elements to enable the opposite synchronization circuit to operate during its respective half-cycle.

The output section of the Darlington synchronization switching transistor Q2 is interconnected through a buffer circuit that includes two transistors Q3 and Q4 connected with an amplifier output transistor Q5. This amplifier transistor Q5 ultimately controls the power switching transistor Q1. The buffer circuit transistors Q3 and Q4 function in cooperation with the amplifier transistor Q5 to trigger the switching transistor Q1 to a conductive state in response to accumulation of energy by the storage capacitors 31 and 32. This switching of Q1 to a conductive state only accurs if the photo-coupled Darlington circuit having the coupling transistor Q6 which determines the synchronization has previously functioned and thus enables this power switching circuit to then transfer the stored electrical energy into the consumer load.

The circuit as thus described is effective in transferring electrical energy into the consumer load whenever a quantity of energy will have been stored by a storage capacitor. This transfer of energy will be initiated at the beginning of a respective halfcycle and will terminate whenever the voltage of the stored energy becomes equal to or less than the voltage of the public distribution network. Consequently, energy will be transferred for less than a half-cycle during the time where the generator 20 is incapable of supply energy to a storage capacitor during its off-duty half-cycle at a rate where transfer will be sustained during an entire duty half-cycle.

For greater efficiency, the circuit is provided with means to sense the amount of energy that is stored by the storage capacitors 31 and 32 and operable to only permit or enable energy transfer when the energy stored reaches a predetermined level. This is accomplished in the illustrative circuit of FIG. 2 by a bidirectional switch 45 which may be selectively switched to a conductive state during either a positive or negative going half-cycle. Sensing of the stored energy level of the coapcitors is effected by zener diodes 46 and 47 that are connected in parallel across the respective storage capacitors 31 and 32. Each zener diode is series connected with a respective steering diode 48 and 49. The juncture of each set of zener and steering diodes, 46 and 48 or 47 and 49 is connected through the leads 50 and 51 to the control terminals of the bidirectional switch 45. This bidirectional switch 45 is illustrated as being of a type controlled by a light emitting diode 52. Operation of this energy level sensing circuit is that when the voltage of storage capacitors 31 and 32 exceeds the breakdown voltage of the zener diode 46 or 47 as the case may be, the switch 45 will be triggered to a conductive state. Then, as determined by the synchronization circuits 40 of the respective switching circuit 37 or 38, the electrical energy stored by the capacitors 31 and 32 will be transferred into the consumer load. Efficiency is thus enhanced where the zener diodes are selected to have a breakdown voltage of about 90 volts in a system where the nominal voltage of the public distribution network is 120 volts.

It will be readily apparent from the foregoing detailed description of an illustrative embodiment of an electrical power generating system embodying this invention that a novel system is provided for supplementing an electrical power distribution network. The inventive system is effective in providing of supplemental electrical power derived from unused available energy sources where the energy would otherwise be ineffectively dissipated or wasted. Storage capability enables the system to effectively function in utilizing such energy in an electrical power system. Synchronization of the transfer of the stored electrical energy with wave-form shaping results in efficient operation that is further enhanced by sensing of the stored energy level to permit transfer only when the energy thus stored reaches a predetermined value.

Having thus described this invention, what is claimed is:

1. An electrical power generating system for supplementing a primary sinusoidal wave-form electrical power source supplying an electrical energy utilization circuit comprising a generator for producting electrical energy of sinusoidal waveform in response to operation thereof by an energy source, electrical energy storage means coupled with said generator in energy receiving relationship for storing the electrical energy received from said generator, said storage means including two capacitor networks and a rectifier circuit operable to convert the generated sinusodial waveform power to direct current for storage by said capacitor networks, and a control circuit having an input connected to said storage means, an output adapted to be connected to the energy utilization circuit, and two switching circuits connected between said input and output and operable to periodically enable transfer of electrical energy from said storage means to said output in synchronized relationship with the sinusoidal wave-form of the primary power source in response to sensing of primary power in the energy utilization circuit, each switching circuit connected with a respective capacitor network and selectively operable to transfer electrical energy therefrom during respective positive-or negative-going half-cycles of the primary power.

2. An electrical power generating system according to claim 1 having switch means interconnected in the output of said control circuit, said switch means selectively controllable between conductive and non-conductive states in response to an input signal, and energy level sensing means connected with said capacitor networks and operative to form said input signal when the stored energy level of said capacitor networks reaches a predetermined minimum level.

3. An electrical power generating system according to claim 1 which includes wave-shaping circuit means interconnected with the output of said control circuit.

4. An electrical power generating system for supplementing a primary sinusodial wave-form electrical power source supplying an electrical energy utilization circuit comprising a generator for producing electrical energy in response to operation thereof by an energy source, electrical energy storage means including a capacitor network coupled with said generator in energy receiving relationship for storing the electrical energy received from said generator, and a control circuit having an input connected to said storage means, an output adapted to be connected to the energy utilization circuit, and a switching circuit connected between said input and output and operable to periodically enable transfer of electrical energy from said storage means to said output in synchronized relationship with the sinusoidal wave-form of the primary power source in response to sensing of primary power in the energy utilization circuit, said switching circuit connected with said capacitor network and being selectively operable to transfer the electrical energy stored in said capacitor network through said output to the energy utilization during at least one of either a positive or negative-going half-cycle of the primary power and to initiate such transfer at the beginning of the respective half-cycle.

5. An electrical power generating system according to claim 4 having switch means interconnected in the output of said control circuit, said switch means selectively controllable between conductive and non-conductive states in response to an input signal, and energy level sensing means connected with said storage means and operative to form said input signal when the stored energy reaches a predetermined minimum.

* * * * *

UNITED STATES PATENT OFFICE
CERTIFICATE OF CORRECTION

Patent No. 4,140,959    Dated February 20, 1979

Inventor(s) William S. Powell

It is certified that error appears in the above-identified patent and that said Letters Patent are hereby corrected as shown below:

Column 8, line 22, after "utilization, insert --circuit--.

*Signed and Sealed this*

*Twelfth* Day of *February 1980*

[SEAL]

*Attest:*

*Attesting Officer*

SIDNEY A. DIAMOND

*Commissioner of Patents and Trademarks*

UNITED STATES PATENT AND TRADEMARK OFFICE
CERTIFICATE OF CORRECTION

PATENT NO. : 4,140,959

DATED : February 20, 1979

INVENTOR(S) : William S. Powell

It is certified that error appears in the above—identified patent and that said Letters Patent is hereby corrected as shown below:

The title page and sheet 2 of the drawings should be deleted to appear as per attachments.

Signed and Sealed this

Nineteenth Day of August 1980

[SEAL]

Attest:

SIDNEY A. DIAMOND

Attesting Officer

Commissioner of Patents and Trademarks

United States Patent [19]

Powell

[11] 4,140,959
[45] Feb. 20, 1979.

[54] ELECTRICAL POWER GENERATING SYSTEM

[76] Inventor: William S. Powell, Rte. 2, Box 203A, Thornville, Ohio 43076

[21] Appl. No.: 706,770

[22] Filed: Jul. 19, 1976

[51] Int. Cl.² .................. F03D 9/00; H02J 3/40
[52] U.S. Cl. .................. 322/100; 307/46; 307/87; 363/136
[58] Field of Search ........... 320/14; 322/2, 35, 100; 307/46, 66, 69, 70, 71, 72, 73, 74, 75, 45, 47, 87; 290/44, 55; 321/8; 363/136

[56] References Cited

U.S. PATENT DOCUMENTS

| | | | |
|---|---|---|---|
| 2,979,551 | 4/1961 | Pack | 320/61 X |
| 3,435,248 | 3/1969 | Geis | 307/46 |
| 3,895,236 | 7/1975 | Herron | 290/44 X |
| 4,010,381 | 3/1977 | Fickensher et al. | 307/66 |
| 4,059,772 | 11/1977 | Wilkerson | 322/2 R |

*Primary Examiner*—Robert J. Hickey
*Attorney, Agent, or Firm*—Mahoney & Stebens

[57] ABSTRACT

An electrical power generating system is provided for supplementing an electrical power distribution network. The supplemental system of this invention is devised to utilize available sources of energy that are otherwise unused and converting that energy to power which is added to and utilized in the normal or primary electrical power distribution network. The system of this invention includes electrical generation means of a type that is adapted to be powered by a specific energy source and develops electrical energy which is stored for intermittent or periodic transfer into the primary power system. An electrical circuit is provided for sensing of the electrical power that is stored and includes a switching circuit that is responsive to the stored electrical power for connecting an electrical energy storage device to the primary electrical network and affect a transfer of electrical power. A sensing and triggering circuit is provided for the detection of the electrical energy storage level and the wave-form of the primary electrical distribution network and is operative in response thereto, for transfer of the electrical energy in synchronized relationship to that wave-form. A waveform shaping circuit is also provided for better matching of the supplemental power transferred to that of the primary circuit.

5 Claims, 3 Drawing Figures

FIG. 2

UNITED STATES PATENT AND TRADEMARK OFFICE
CERTIFICATE OF CORRECTION

PATENT NO. : 4,140,959
DATED : February 20, 1979
INVENTOR(S) : William S. Powell It is certified that error appears in the above—identified patent and that said Letters Patent is hereby corrected as shown below:

The title page and sheets 1 and 2 of the drawings should be deleted to appear as per attachments.

This certificate supersedes Certificate of Correction issued August 19, 1980.

Signed and Sealed this

Third Day of February 1981

[SEAL]

Attest:

RENE D. TEGTMEYER

Attesting Officer

Acting Commissioner of Patents and Trademarks

United States Patent [19]

Powell

[11] 4,140,959
[45] Feb. 20, 1979.

[54] ELECTRICAL POWER GENERATING SYSTEM

[76] Inventor: William S. Powell, Rte. 2, Box 203A, Thornville, Ohio 43076

[21] Appl. No.: 706,770

[22] Filed: Jul. 19, 1976

[51] Int. Cl.² .......................... F03D 9/00; H02J 3/40
[52] U.S. Cl. ................................ 322/100; 307/46; 307/87; 363/136
[58] Field of Search ............... 320/14; 322/2, 35, 100; 307/46, 66, 69, 70, 71, 72, 73, 74, 75, 45, 47, 87; 290/44, 55; 321/8; 363/136

[56] References Cited

U.S. PATENT DOCUMENTS

| | | | |
|---|---|---|---|
| 2,979,551 | 4/1961 | Pack | 320/61 X |
| 3,435,248 | 3/1969 | Geis | 307/46 |
| 3,895,236 | 7/1975 | Herron | 290/44 X |
| 4,010,381 | 3/1977 | Fickensher et al. | 307/66 |
| 4,059,772 | 11/1977 | Wilkerson | 322/2 R |

*Primary Examiner*—Robert J. Hickey
*Attorney, Agent, or Firm*—Mahoney & Stebens

[57] ABSTRACT

An electrical power generating system is provided for supplementing an electrical power distribution network. The supplemental system of this invention is devised to utilize available sources of energy that are otherwise unused and converting that energy to power which is added to and utilized in the normal or primary electrical power distribution network. The system of this invention includes electrical generation means of a type that is adapted to be powered by a specific energy source and develops electrical energy which is stored for intermittent or periodic transfer into the primary power system. An electrical circuit is provided for sensing of the electrical power that is stored and includes a switching circuit that is responsive to the stored electrical power for connecting an electrical energy storage device to the primary electrical network and affect a transfer of electrical power. A sensing and triggering circuit is provided for the detection of the electrical energy storage level and the wave-form of the primary electrical distribution network and is operative in response thereto, for transfer of the electrical energy in synchronized relationship to that wave-form. A wave-form shaping circuit is also provided for better matching of the supplemental power transferred to that of the primary circuit.

5 Claims, 3 Drawing Figures